Figure 1:
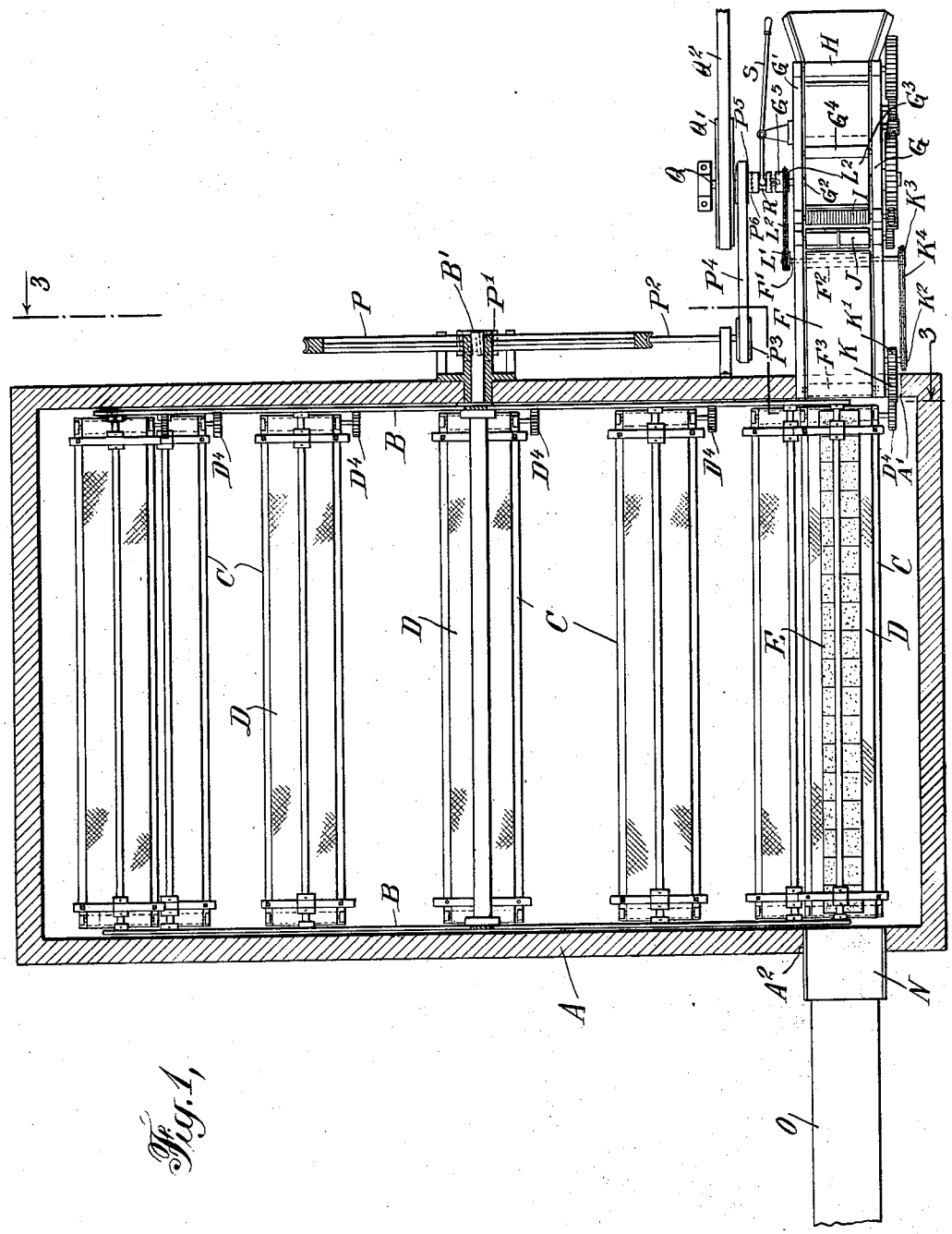

A. STREIT.
FORMING, CHARGING, AND REMOVING DEVICE FOR BAKERS' OVENS.
APPLICATION FILED JULY 13, 1915.

1,165,035.

Patented Dec. 21, 1915.
3 SHEETS—SHEET 1.

WITNESSES

INVENTOR
Aron Streit
BY
ATTORNEYS

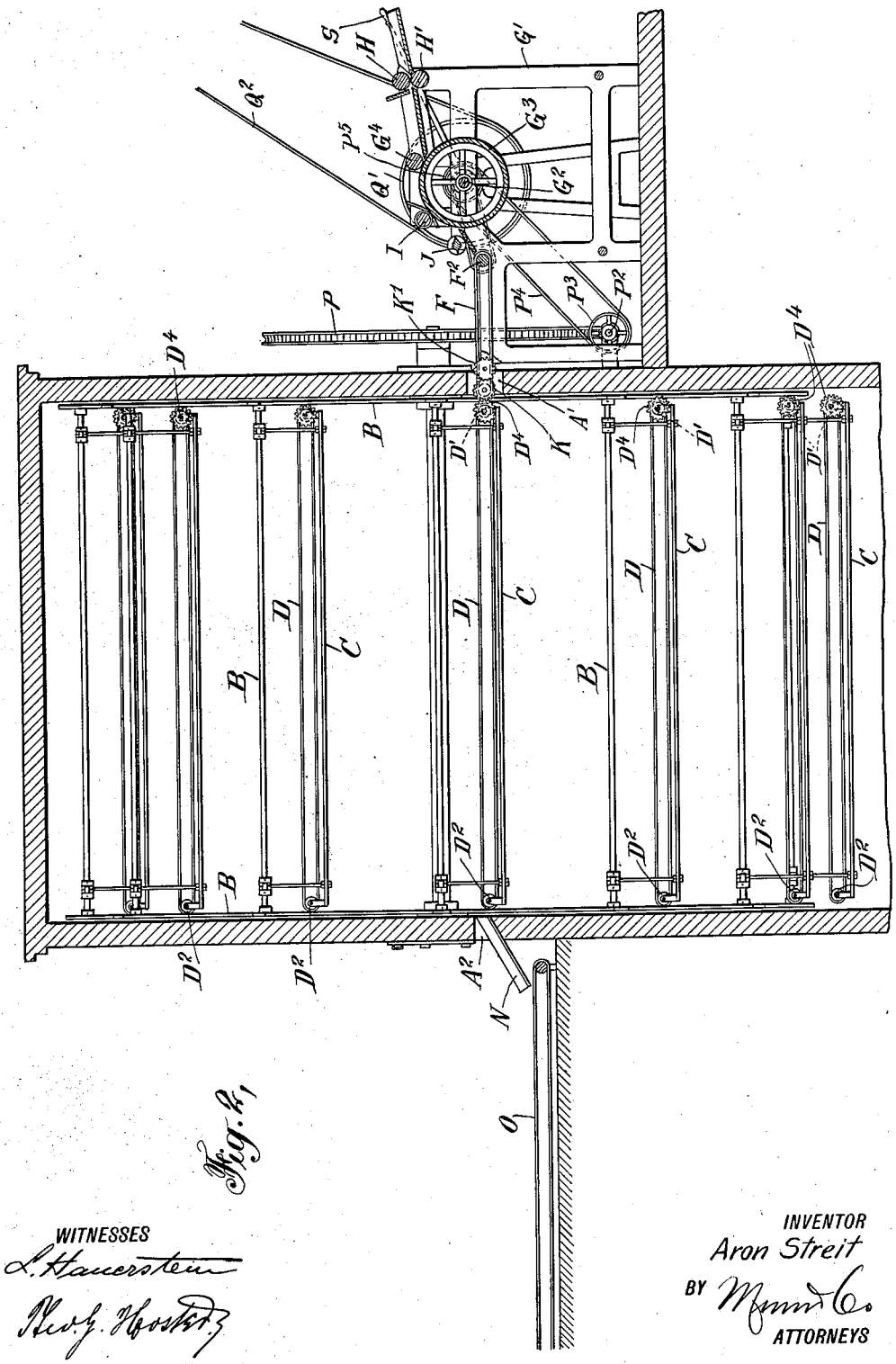

A. STREIT.
FORMING, CHARGING, AND REMOVING DEVICE FOR BAKERS' OVENS.
APPLICATION FILED JULY 13, 1915.
1,165,035.
Patented Dec. 21, 1915.
3 SHEETS—SHEET 3.
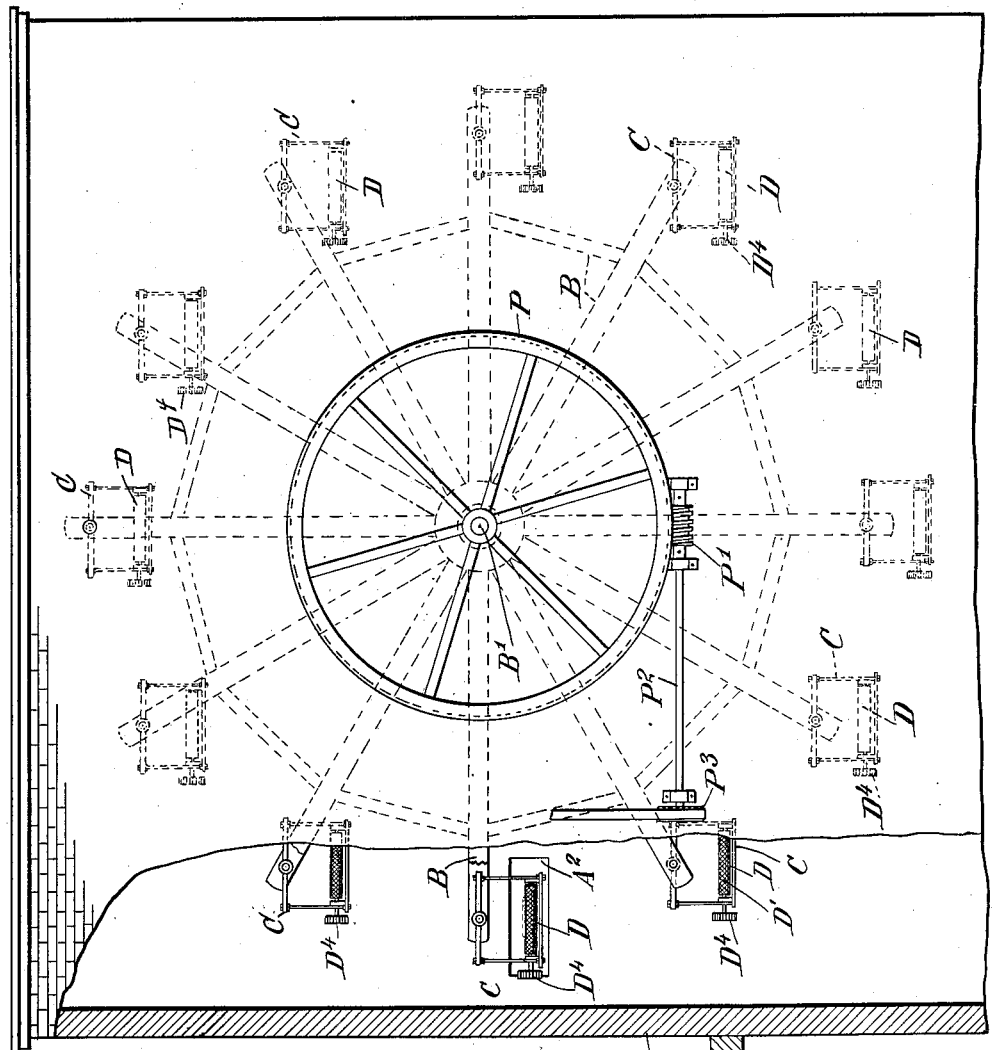
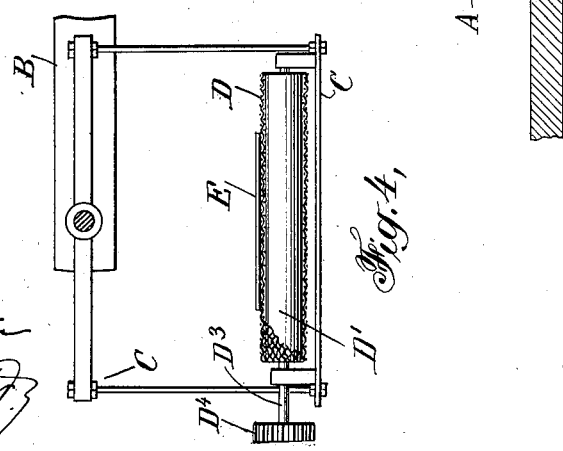
WITNESSES
INVENTOR
Aron Streit
BY
ATTORNEYS

UNITED STATES PATENT OFFICE.

ARON STREIT, OF NEW YORK, N. Y.

FORMING, CHARGING, AND REMOVING DEVICE FOR BAKERS' OVENS.

1,165,035.  Specification of Letters Patent.  Patented Dec. 21, 1915.

Application filed July 13, 1915. Serial No. 39,603.

*To all whom it may concern:*

Be it known that I, ARON STREIT, a citizen of the United States, and a resident of the city of New York, borough of Manhattan, in the county and State of New York, have invented a new and Improved Forming, Charging, and Removing Device for Bakers' Ovens, of which the following is a full, clear, and exact description.
The invention relates to bakers' ovens of the reel type, and its object is to provide a new and improved forming, charging and removing device, more especially designed to enable a single operator to control the feeding of the matzoth from a forming and cutting machine onto carriers mounted on the reel, and to automatically control the discharge of the baked articles from the carriers.
In order to accomplish the desired result, use is made of an oven in which revolves intermittently a reel provided with endless carriers for supporting the articles to be baked, the oven being provided with oppositely disposed inlet and discharge openings, and a molding machine for molding the dough into articles to be baked in the oven, the molding machine having an endless delivery apron or belt extending into said inlet opening to discharge the articles directly onto the carrier in register with the inlet opening at the time, and manually controlled means for simultaneously controlling the said reel and the said molding machine to stop one while starting the other. Use is also made of endless carriers on the reel for supporting the articles to be baked and adapted to be driven at the time the reel is at rest to deliver the baked articles through the discharge opening to the outside of the oven. Use is also made of a gearing for driving the carrier from the said molding machine at the time the carrier is in register with the oven openings and the reel is at rest.

A practical embodiment of the invention is represented in the accompanying drawings forming a part of this specification, in which similar characters of reference indicate corresponding parts in all the views.

Figure 1 is a sectional plan view of a baker's oven provided with the forming, charging and removing device; Fig. 2 is a cross section of the same; Fig. 3 is a side elevation of the same with the parts in section on the line 3—3 of Fig. 1; and Fig. 4 is an enlarged sectional side elevation of one of the carriers hung on the reel.

Within the usual brickwork or housing A of a baker's oven is mounted to rotate intermittently a reel B provided with swing frames C, on each of which is mounted an endless carrier or apron D, preferably of wire netting, passing around rollers D', D² journaled on the corresponding frame C. The upper end of each carrier D is adapted to support a series of matzoth or other articles to be baked in the oven, which latter is heated in the usual manner so that further description of this part of the baker's oven is not deemed necessary. When the reel B is at rest one of the frames C and its carrier D is in register with an inlet opening A' and an outlet opening A², the openings being formed directly opposite each other on opposite sides of the housing A, as plainly indicated in Figs. 1 and 2. Into the inlet opening A' extends an endless feed belt F forming part of a molding machine G of any approved construction for rolling a shapeless mass of dough into a sheet and cutting the sheet into the individual articles E to be baked in the oven. The molding machine G shown in the drawings is similar to the one shown and described in the Letters Patent of the United States, No. 431,149, granted on July 1, 1890, to Joseph Parr. The molding machine G in its general construction is mounted on a framework G' in which is journaled a shaft G² carrying a drum G³ operating in conjunction with rollers G⁴ for pressing the dough into final sheet form, the dough receiving a preliminary pressing prior to reaching the roller G⁴ by being passed between a pair of rollers H and H'. In front of the roller G⁴ is arranged a rotary die I for making a desired impression on the sheet of dough, and next to this die I is arranged a revolving knife J for cutting the sheet of dough into articles E of the desired size.

The articles E are carried by the apron F through the openings A' onto the endless carrier D in register with the openings A', A² at the time and while the reel B is at a standstill. For the purpose mentioned the shaft D³ of the roller D' of each carrier D is provided with a gear wheel D⁴ adapted to mesh with an intermediate gear wheel K journaled on the frame G' and in mesh with a gear wheel K' likewise journaled on the frame G' and driven by sprocket wheels K², K³ and a sprocket chain K⁴ from a shaft F′ carrying the front roller F² of the apron F, the rear roller F³ of which extends within the opening A′. The shaft F′ is connected by sprocket wheels L, L′ and a sprocket chain L² with the shaft G² of the molding machine G so that when the latter is rotated a rotary motion is given to the gear wheel K⁴ to rotate the gear wheel D⁴ and thus impart a traveling motion to the carrier D for the latter to carry the baked articles onto a chute N arranged in the opening A² and leading to an endless carrier O for carrying the baked articles to a baking table.

In order to conveniently rotate the reel B and to intermittently rotate the molding machine G in such a manner that when the reel B is rotating the molding machine is at a standstill and vice versa, the following device is provided: The shaft B′ of the reel B extends to the outside of the housing A and on the outer end of this shaft B′ is secured a worm wheel P in mesh with a worm P′ secured on a shaft P² journaled in suitable bearings arranged on the outside of the housing A. On the shaft P² is secured a pulley P³ connected by a belt P⁴ with a pulley P⁵ mounted to rotate loosely on a driving shaft Q carrying a pulley Q′ connected by belt Q² with other machinery for imparting a continuous rotary motion to the shaft Q. A double clutch R is mounted to turn with the shaft Q and is mounted to slide forward by the action of a clutch lever S under the control of the operator in charge of the machine. The double clutch R is adapted to be engaged with a clutch member P⁶ on the pulley P⁵ or with a clutch member G⁵ on the shaft G². When the lever S is in the position shown in Fig. 1 then the reel B is driven from the driving shaft Q while the molding machine G is at a standstill. When the next frame C, its carrier D and baked articles E reach the openings A′, A² then the operator changes the position of the lever S so that the reel B is stopped while the molding machine G is started. When this takes place the articles to be baked are formed and cut by the molding machine G and are fed by the belt F to the carrier D now in register with the belt F and driven by the gear wheel K in mesh with the gear wheel D⁴ of this carrier. Thus the baked articles on the carrier D are moved to the chute N while the unbaked articles on the apron D are passed onto the carrier D, and when the last baked article on the carrier D has passed down the chute N and the upper run of the apron is refilled with the unbaked articles then the operator returns the lever S to its former position so that the molding machine G is stopped and the reel B is started. When the next frame C, carrier D and the baked articles E reach the openings A′, A² then the above described operation is repeated, that is, the lever S is again shifted to stop the reel B and to start the molding machine G.

It will be noticed that by the arrangement described but a single operator is needed for charging the carriers on the reel, for emptying the carriers of the baked articles, and for driving the molding machine G used for pressing a shapeless mass of dough into the articles to be baked.

Although the apparatus is primarily designed for baking matzoth, it is equally serviceable for baking crackers, bread and cake.

Having thus described my invention, I claim as new and desire to secure by Letters Patent:

1. In combination, a baker's oven provided with a reel having endless carriers, the oven having an inlet opening, a feeding device for feeding the articles to be baked through the said inlet opening onto the endless carriers, and a manually controlled driving means adapted to be alternately connected with the said reel and the said feeding device to drive the reel while the feeding device is at a standstill and vice versa.

2. In combination, a baker's oven provided with an inlet and a discharge opening, a reel mounted to rotate intermittently in the said oven and having endless carriers adapted to register with the said openings, a feeding device having an endless carrier extending into the said inlet opening in alinement with the carrier at the opening at the time, and a manually controlled driving means adapted to be alternately connected with the said reel and the said feeding device to drive the reel while the feeding device is at a standstill and vice versa.

3. In combination, a baker's oven provided with an inlet and a discharge opening, a reel mounted to rotate intermittently in the said oven and having endless carriers adapted to register with the said openings, a feeding device having an endless carrier extending into the said inlet opening in alinement with the carrier at the opening at the time, a gearing for driving the carrier, located at the openings at the time, from the said feeding device to feed the baked articles through the outlet opening and to fill the carrier with the articles to be baked and delivered by the feeding device, and a manually controlled driving means adapted to be alternately connected with the said reel and the said feeding device to drive the reel while the feeding device is at a standstill and vice versa.

4. A baker's oven having an inlet opening, a reel revolving intermittently in the said oven, endless carriers mounted on the said reel and adapted to register with the said opening, manually controlled means for stopping the reel at the time a carrier registers with the said opening, a gear wheel on each endless carrier, and a driven gear wheel at the said opening and adapted to mesh with the gear wheel on the carrier at the time the carrier reaches the opening.

5. A baker's oven having an inlet opening, a reel revolving intermittently in the said oven, endless carriers mounted on the said reel and adapted to register with the said opening, manually controlled means for stopping the reel at the time a carrier registers with the said opening, a gear wheel on each endless carrier, and an endless feed apron extending into the said opening and provided with a driven gear wheel adapted to mesh with the said gear wheel on the carrier at the time the carrier reaches the opening.

6. A baker's oven having an inlet opening and an outlet opening, the openings being arranged opposite each other, a reel mounted to rotate intermittently in the oven, endless carriers mounted on the said reel and adapted to register with the said openings, manually controlled means for bringing the reel to rest, at the time a carrier registers with the said openings, and driving means for driving the carrier in position at the said openings at the time.

7. A baker's oven having an inlet opening and an outlet opening, the openings being arranged opposite each other, a reel mounted to rotate intermittently in the oven, endless carriers mounted on the said reel and adapted to register with the said openings, each carrier having a gear wheel, a molding apparatus having a driven endless apron extending into the said inlet opening, a gearing driven from the said apparatus and extending into the said opening to be engaged by the gear wheel of the carrier at the time the latter moves into register with the said opening, a driving pulley and a clutch mechanism under the control of the operator for connecting the said driving pulley alternately with the said reel and the said molding apparatus.

In testimony whereof I have signed my name to this specification in the presence of two subscribing witnesses.

ARON STREIT.

Witnesses:
 THEO. G. HOSTER,
 GEORGE H. EMSLIE.